United States Patent [19]

Schmidt et al.

[11] Patent Number: 4,804,257
[45] Date of Patent: Feb. 14, 1989

[54] VIBRATION DAMPED MIRROR APPARATUS FOR A VEHICLE

[76] Inventors: William B. Schmidt, 21000 Woodruff, Rockwood, Mich. 48173; Frank D. Hutchinson, 28000 Beel Rd., New Boston, Mich. 48164

[21] Appl. No.: 83,281

[22] Filed: Aug. 10, 1987

[51] Int. Cl.$^4$ .............. G02B 7/18; B60R 1/06; B60R 1/08

[52] U.S. Cl. .................. 350/626; 350/632; 248/479; 248/487

[58] Field of Search .......... 350/626, 612, 625, 632, 350/631, 615; 248/476, 475.1, 479, 486, 487

[56] References Cited

U.S. PATENT DOCUMENTS

| 2,708,086 | 5/1955 | Prutzman | 350/616 |
|---|---|---|---|
| 2,764,913 | 10/1956 | Green | 350/616 |
| 3,424,424 | 1/1969 | Kelley | 350/616 |
| 4,156,557 | 5/1979 | Skewis | 350/616 |
| 4,208,104 | 6/1980 | Peterson | 350/616 |
| 4,715,701 | 12/1987 | Urban | 350/631 |

FOREIGN PATENT DOCUMENTS

| 378068 | 9/1907 | France | 350/626 |
|---|---|---|---|
| 2579148 | 9/1986 | France | 350/632 |
| 147962 | 9/1931 | Switzerland | 350/626 |

*Primary Examiner*—Jon W. Henry
*Attorney, Agent, or Firm*—Arnold S. Weintraub

[57] ABSTRACT

A vibration damping apparatus for mirrors mounted on a movable vehicle. The apparatus includes an elongated bar having outwardly extending, perpendicular, parallel spaced legs. The legs are fastenably secured within an attachment bracket secured or integrally formed on the back surface of each mirror member. The mirrors may be pivoted about the longitudinal axis of each leg of the bar. Connectors are provided for connecting portions of the post of the bar, adjacent to each leg member, to the vehicle. This may be directly to the vehicle or attachment to a post attached directly by itself to the vehicle.

8 Claims, 2 Drawing Sheets

VIBRATION DAMPED MIRROR APPARATUS FOR A VEHICLE

BACKGROUND OF THE INVENTION

1. Field of the Invention

This invention relates, in general, to mirrors and, more specifically, to mirror apparatus mounted on vehicles.

2. Description of the Prior Art

Mirrors having a visual reflective surface, typically on one side thereof, are commonly mounted on the exterior side surfaces of a vehicle adjacent the forward portion of the passenger compartment to enable the driver and/or passengers of the vehicle to view rearward along the sides of the vehicle to see obstructions in the rearward path of the vehicle as well as rear approaching vehicles. Ordinarily, the mirrors are mounted on the sides of the vehicle directly on the vehicle sheet metal or on a bracket or post which itself is attached on the vehicle body.

Larger vehicles, such as tractor trailers or large single body trucks, pose problems for efficient use of the side-view mirrors due to the engine horsepower, load and weight of the trucks on rough roads or highways. Such vehicles have a tendency to vibrate vertically during forward or rearward movement which is transmitted through the mirror mounting brackets directly to the mirror. Due to the constant vibration of the reflective surface of the mirror, vision is impaired for the driver and/or passenger of the vehicle. This increases problems for safe operation of such vehicles.

Thus, it would be desirable to provide a mirror apparatus mountable on vehicles which overcomes the problems encountered with previously devised apparatus of such nature. It would also be desirable to provide a mirror apparatus mounted on a vehicle which eliminates vibration of the reflective mirror surface caused by vehicle movement.

SUMMARY OF THE INVENTION

This invention is a vibration damping means for a mirror apparatus which is intended for use on a movable vehicle. The apparatus includes first and second spaced mirrors each having a visual reflective surface formed on at least on one side thereof. Means are provided for damping vibrations of the first and second mirrors caused by movement of the vehicle. Means are also provided for connecting the mirror apparatus to the vehicle.

In a preferred embodiment, the vibration damping means includes a U-shaped bar having an elongated post or bight section. The post is provided with first and second ends. Spaced apart first and second legs, respectively, extend from or are separately attached to the first and second ends of the post and extend outwardly from and substantially perpendicular to the post to form the U-shaped bar. In use, the first and second legs extend outward from the vehicle when the bar is mounted on the vehicle. Preferably, the legs and bar are integrally formed with the first and second legs being bent outwardly and perpendicularly to the end portions of the bar.

Attachment means are provided for attaching the ends of the first and second legs of the bar to each of the first and second mirrors, respectively. The attachment means comprises a cover member which is removably fastened to the rear or non-reflective surface of the mirror. The cover member includes or forms a through bore between itself and the backside of the mirror which removably receives the end portion of an associated first or second leg of the bar. This allows the first and second mirrors to be mounted on the legs of the bar and also to be pivotally movable about the axis of the associated leg, as desired, by the driver or passenger of the vehicle.

Connecting means for connecting the bar to the vehicle is also provided. Preferably, the connecting means includes a second bar which is permanently attached to the exterior surface metal of the vehicle. Clamp members extend between the elongated post of the U-shaped bar and the second bar to secure the two bars together.

The vibration damping apparatus of the present invention through the use of the bar interconnected to the two mirrors eliminates vibration of the mirrors caused by movement of the vehicle to which the mirror assembly is attached. This is due to the U-shaped bar damping the separate and diverse vibrations of the two spaced mirrors. Besides this advantage, the two spaced mirrors also enable the operator or passenger of the vehicle to selectively position the upper mirror at a different angle with respect to the lower mirror.

BRIEF DESCRIPTION OF THE DRAWING

The various uses, advantages and other features of the present invention will become more apparent by referring to the following detailed description and drawing in which.

DESCRIPTION OF THE PREFERRED EMBODIMENTS

Figure 1:
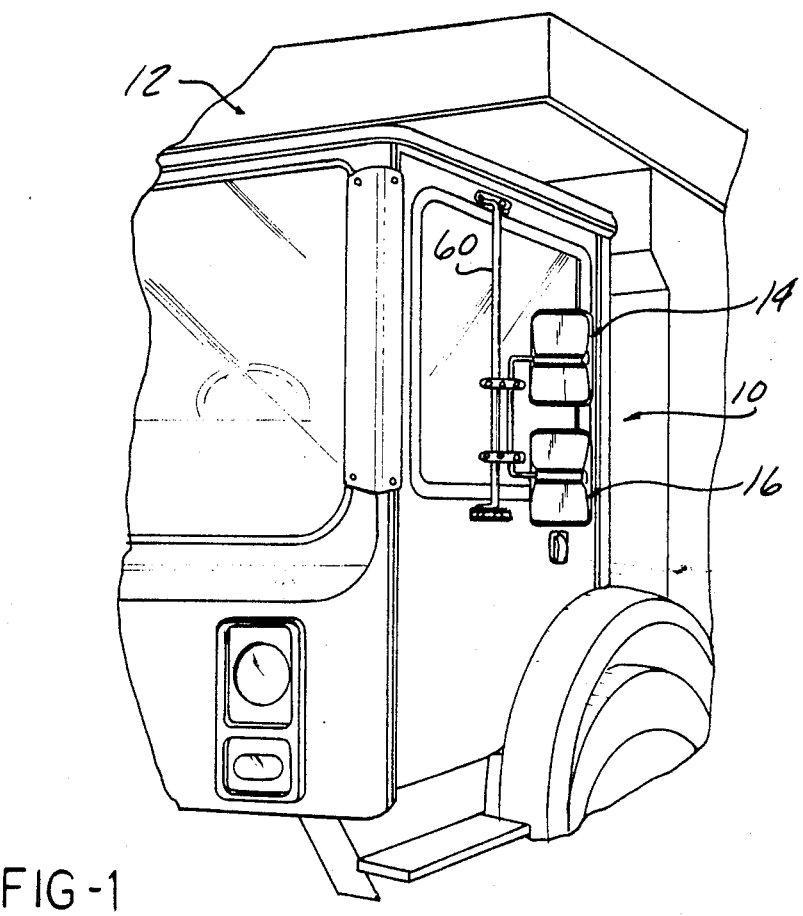
FIG. 1 is a partial, perspective view showing the mounting of the mirror apparatus of the present invention on a side window of a vehicle.

Throughout the following description and drawing, an identical reference number is used to refer to the same component shown in multiple figures of the drawing.

Referring now to the drawing, and in reference to FIGS. 1–4, there is illustrated a vibration damping mirror apparatus 10 mounted on a vehicle 12 which dampens and eliminates vibration of the mirror apparatus 10 during movement of the partially illustrated vehicle 12.

It will be understood that although the mirror apparatus 10 of the present invention is advantageously used with large size vehicles, such as semi-trailers, large single body trucks, they may also be employed in other vehicles where mirror vibration poses a problem. Also, the mirror apparatus 10 may be employed on the exterior sides of either or both of the driver or passenger sides of the vehicle 12.

Figure 2:
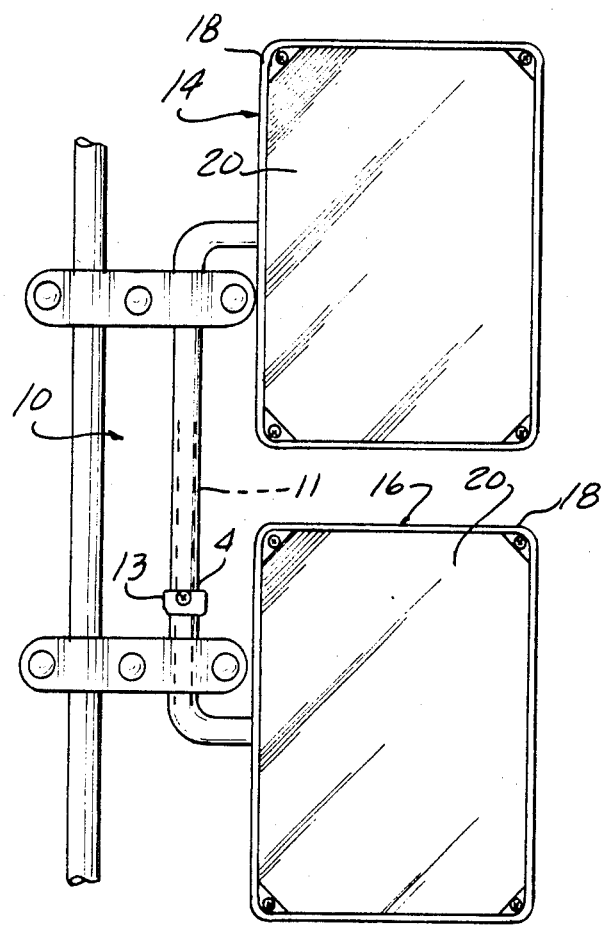
FIG. 2 is a front view of the mirror apparatus of the present invention.

As shown in FIGS. 1 and 2, the mirror apparatus 10 includes first and second mirrors or mirror assemblies 14 and 16, respectively. Each of the first and second mirror assemblies 14 and 16 include a mirror body 18, which may be formed of any suitable material, such as plastic, lightweight metal, etc. The body 18 may have any general size or shape, such as rectangular, square, circular, etc. as desired by the operator of the vehicle, for safe operation of the vehicle or to meet governmental requirements. The body 18 has the mirror reflective surface 20 mounted thereon. Thus, as used herein the term "mirror" or "mirror assembly" 14 or 16 includes the body 18 and the reflective surface 20.

Figure 3:
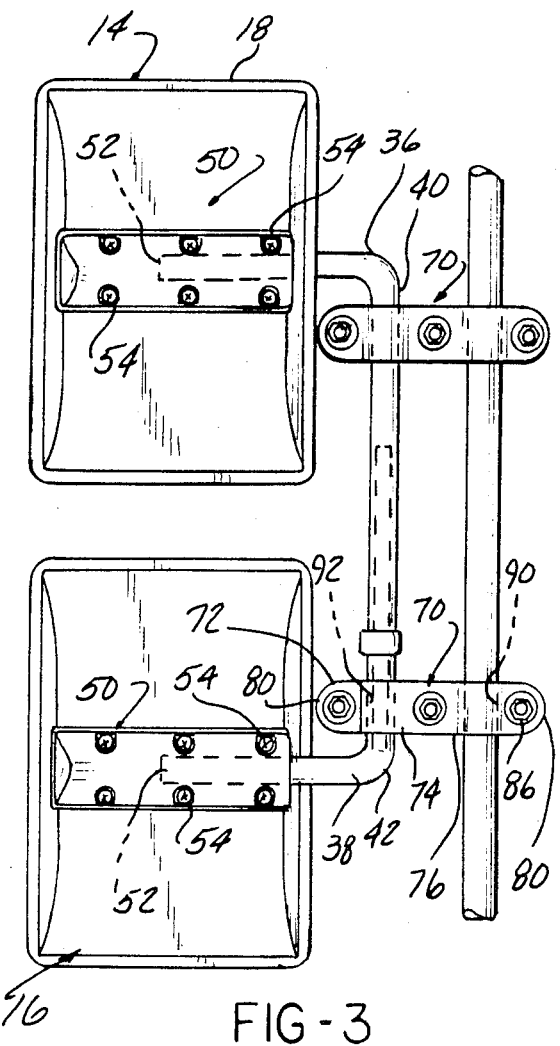
FIG. 3 is a rear view of the mirror apparatus shown in FIG. 2.

It should be noted, that as shown in FIGS. 1, 2 and 3, the first and second mirror assemblies 14 and 16 are illustrated and described hereafter as having a generally rectangular, identical shape. Other combinations, such as an upper mirror assembly 14 and a larger sized mirror assembly 16, or vice-versa may, also be employed depending upon the application of the mirror apparatus 10 of the present invention.

As noted, each of the mirror assemblies 14 and 16 also include a visual reflective surface noted in general by reference number 20 mounted on one side facing the occupants of the vehicle 12 when the mirror apparatus 10 is mounted adjacent the front edge of the vehicle side window, as shown in FIG. 1. The reflective surface 20 may be of conventional form and is not germane to this invention.

Also, the exterior surface of each reflective surface 20 may have any particular form, such as a planar form as shown in FIG. 2, or a convex, outwardly extending shape depending upon the particular application.

Likewise, it is possible, although not preferred, that the present invention be associated with a single mirror assembly wherein the U-shaped bar is attached to the single assembly proximate the vertical upper and lower regions thereof.

Returning to the drawing, and as shown therein associated with the mirror assemblies 14, 16 is a vibration damping means, generally, denoted at 10. As shown in FIGS. 1–3, the damping means or apparatus 10 comprises a U-shaped bar including an elongated post or bight 30 which is formed of a tubular, preferably hollow metallic member. The tubular member 30 is an elongated, hollow cylindrical member having first and second opposed ends 40, 42, respectively.

Figure 4:
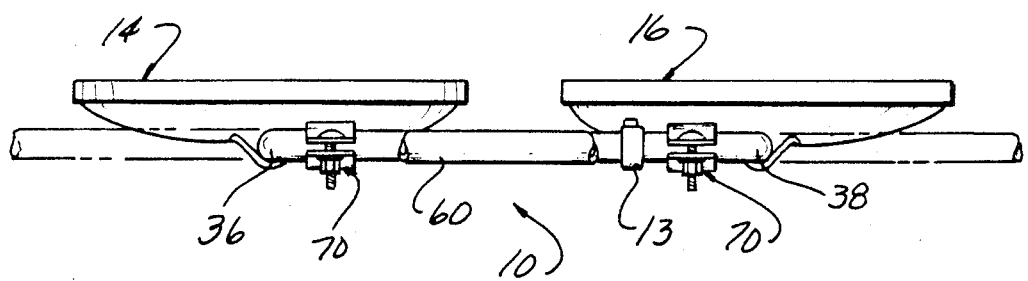
FIG. 4 is a left-hand side view of the mirror apparatus shown in FIG. 2.

First and second legs 36 and 38 are attached to or integrally formed with associated first and second ends 40 and 42 of the post 30, as shown. Preferably, the first and second legs 36 and 38 are integrally formed with the post 30 and are bent at a gradually increasing angle until they extend substantially perpendicular to the longitudinal axis of the post 30 as shown in FIGS. 2 and 3. The legs 36 and 38 also are aligned along the same plane as shown in Figure 4. It should also be understood that the legs 36 and 38 may be separately attached to the post 30 by means of welding, etc.

Figure 5:
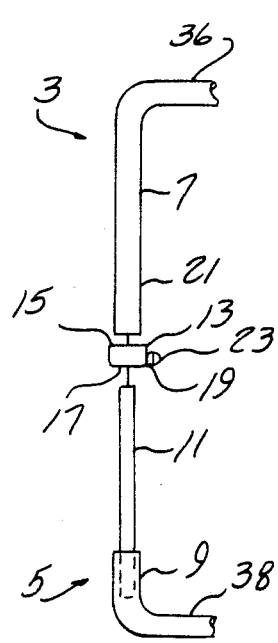
FIG. 5 is an exploded, partially broken view of the vibration damping apparatus hereof.

In a preferred embodiment hereof, and as shown in FIG. 5, the U-shaped bar is formed from two separable members 3, 5 respectively. The member 3 is preferably, an integrally formed L-shaped member having legs 7 and 36, as shown. The member 5 is, likewise, an integrally formed L-shaped and includes legs 9 and 28, as shown.

The separable member 3, 5 are hollow, tubular cylindrical members.

As shown in FIG. 5, disposed within the member 5 is a reduced diameter, tubular member 11. The member 9 functions to assist the damping effect and to provide structural integrity to the post 30.

The tubular member 11 is fixed in position when the member 5 is bent into legs 9 and 38 by first inserting the member 9 into the member 5 and, then, bending the assembly into its respective legs 9, 38.

A slide ring 13 having an open top and an annular bottom flange 17 is movably slidable along the exposed extent of the tubular member 11.

The slide ring 13 has a diameter slightly greater than that of the leg 7. The flange 17 acts as a seat for the free end of the leg 7 and provides an diametric opening in the bottom of the ring less than that of the leg 7 but larger than that of member 11.

Thus, the member 11 projects into the interior of leg 7 to provide length adjustment, structured support and improved damping to the assembly when the two members are joined together to form the U-shaped bar.

As shown in FIG. 5, the ring 13 has an aperture 19 formed thereon which communicates with an aperture 21 formed proximate the free end of leg 7. A set screw 21 projects through the mating aperture 19 and 21 to interlock leg 7 with the leg 7 via the member 11 when the latter inserted into the interior of the leg 7. It is to be further appreciated that by the construction the member 3 is longitudinally positionable along the extent of the exposed portion of the member 11.

Thus, the two members 3 and 5 when joined together combine to form the U-shaped bar having post 30 and legs 36 and 38.

Means are provided on the mirror assemblies 14 and 16 to connect the mirror assemblies 14 and 16 to the outer extremities of the legs 36 and 38 of the bar. The connecting means on each mirror assembly 14 and 16 is in the form of a projection 50 integrally mounted on the back surface of the mirror assemblies 14 and 16 or, preferably, fastenably secured thereto as shown in FIG. 3.

As shown in FIG. 3, the connecting means 50 comprises an upwardly extending, substantially, V-shaped member, formed of the same material as the body of the mirror assemblies 14 and 16, which is secured to a central, laterally extending portion of the back surface of the mirror assembly. A bore 52 extends through the projection or attachment 50 at least a partial longitudinal length therethrough to removably receive the ends 36 and 38 of the bar 30.

Fastening means denoted, in general, by fasteners 54 which are provided in a plurality of numbers along the spaced length of the projection 50 extend through the projection 50 into the body of the mirror frames 14 and 16 to provide predetermined pressure on the secured ends of the legs 36 and 38. This allows the mirrors 14 and 16 to be pivotally positioned about the axis of the legs 36, 38 of the damping means 10, as desired, by the occupants of the vehicle 12.

Means are also provided for attaching the mirror assembly 10 to the vehicle 12. In a typical embodiment, as shown in the various figures of the drawing, the connecting means comprises a vertically extending second bar 60, typically formed of a hollow, tubular, metallic material which is disposed in proximity with and secured to the vertical side surface of the passenger compartment of the vehicle as shown in FIG. 1 by suitable attachment means.

Clamp means denoted in general by reference number 70 as shown in FIG. 3 are provided for connecting the between the mirror apparatus 10 and the bar 60. In a preferred embodiment, the clamp means 70 comprises a pair of spaced alternately arcuately shaped, planar members having apertures therethrough for receiving suitable fasteners, such as nuts and bolts, which receive portions of the post 30 and bar 60 therethrough as shown in FIGS. 2 and 3. Generally, the clamp members 70 comprise two spaced members, each having the same shape with a flat planar portion 72, an outwardly extending circular arcuate portion 74 which descends to a planar portion 76, which again extends outwardly to an arcuate portion which extends downward and terminates in a planar portion 80. This forms two bores 90 and 92 extending between the clamp members 70 when they are disposed in adjoining fastening abutment by the fasteners to receive a portion of the post 30 and the bar 60.

Tightening of the fastening means denoted in general by reference number 86 which covers the plurality of fastening means employed along each fastener 70 between the spaced projections 90 and 92 in each clamp member 70 to securely attach the mirror mounting apparatus 10 to the connecting means 60 which is securely mounted to the vehicle 12. In this manner, the mirror apparatus 10 comprised of the separate mirror assemblies 14 and 16 integrally connected by the bar assembly 30 is securely attached to the vehicle 12 for normal use in rear viewing by the occupants of the forward passenger compartments of the vehicle 12; and, yet, enables vibration free positioning of the separate mirror assemblies 14 and 16 as provided by the interconnected bar 30 which dampens the harmonic vibrations in the separate mirror assemblies 14 and 16 caused by movement of the vehicle 12 on which the mirror assembly 10 is attached.

What is claimed is:

1. A dual mirror assembly for a vehicle comprising:
    a pair of vertically spaced apart mirrors, each having at least one visual reflective surface;
    means for damping vibrations transmitted to the mirrors upon movement of the vehicle, said means comprising: (1) a first bar having an elongated post with first and second ends having first and second spaced apart legs, respectively, extending from the first and second ends, the legs being perpendicular to the post; the first bar having a, generally, U-shaped configuration; the mirrors being attached to the bar by attachment means; and
    means for connecting the vibration damping means to the vehicle, comprising:
    a second substantially vertically extending bar having an upper end and lower end wherein both the upper and lower end are fixedly secured to the side of the vehicle;
    and a clamping means to connect the vibration damping means to the second vertically extending bar.

2. The mirror assembly of claim 1 wherein the attachment means for attaching the mirrors to the vibration damping means comprises:
    projection means mountable on the first and second mirrors;
    the projection means including a through bore partially extending through the projection means; and
    the end portion of one of the legs of the bar being removably insertable into the bore within the projection means.

3. The mirror assembly of claim 2 further including:
    means for fastening the projection to the first and second mirrors, respectively.

4. The mirror assembly of claim 1 wherein the clamping means comprises:
    a clamp member having a first end and a second end, the first end securingly attaching to the post of the vibration damping means and the second end attaching to the second vertically extending bar attached to the vehicle.

5. The mirror assembly means of claim 4 wherein the clamping means comprises:
    the second end of the clamp member being releasably attachable to the post of the mirror apparatus.

6. The mirror assembly of claim 4 which further includes a plurality of clamp members.

7. The mirror assembly of claim 1 wherein the U-shaped bar comprises:
    a pair of separable L-shaped tubular legs, and
    means for interconnecting together the L-shaped members to form the U-shaped member.

8. The mirror assembly of claim 7 which further comprises:
    a tubular member disposed within one of the L-shaped members and projecting therebeyond, the projecting portion of the member being projectionable into the other L-shaped member, and
    fastening means for fastening the member to the other L-shaped member.

* * * * *